(12) United States Patent
Shiiki et al.

(10) Patent No.: US 9,971,345 B2
(45) Date of Patent: May 15, 2018

(54) MANUFACTURING PROCESS MANAGEMENT SUPPORT DEVICE

(71) Applicant: OSG CORPORATION, Toyokawa, Aichi (JP)

(72) Inventors: Takashi Shiiki, Toyokawa (JP); Masahiko Ide, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 788 days.

(21) Appl. No.: 14/400,740

(22) PCT Filed: Nov. 15, 2012

(86) PCT No.: PCT/JP2012/079714
§ 371 (c)(1),
(2) Date: Nov. 12, 2014

(87) PCT Pub. No.: WO2014/076807
PCT Pub. Date: May 22, 2014

(65) Prior Publication Data
US 2015/0134098 A1    May 14, 2015

(51) Int. Cl.
*G05B 19/418*    (2006.01)
*H04L 29/08*    (2006.01)

(52) U.S. Cl.
CPC ........ *G05B 19/41875* (2013.01); *H04L 67/10* (2013.01); *G05B 2219/31455* (2013.01);
(Continued)

(58) Field of Classification Search
None
See application file for complete search history.

(56) References Cited

U.S. PATENT DOCUMENTS

| | | |
|---|---|---|
| 6,850,636 B1 | 2/2005 | Yabe |
| 2003/0167238 A1* | 9/2003 | Zeif .................. G05B 23/0267 705/400 |

(Continued)

FOREIGN PATENT DOCUMENTS

| | | |
|---|---|---|
| JP | 05-166025 A | 7/1993 |
| JP | 09-114889 A | 5/1997 |

(Continued)

OTHER PUBLICATIONS

Extended European Search Report dated Jan. 20, 2016, issued in counterpart European Patent Application No. 12888219.8. (7 pages).

(Continued)

*Primary Examiner* — Tuan Dao
(74) *Attorney, Agent, or Firm* — Westerman, Hattori, Daniels & Adrian, LLP

(57) ABSTRACT

There is a provided manufacturing process management support device that has an input means for inputting information indicative of the fact that work related to a manufacturing process is performed, and is capable of increasing the reliability of result information. A handy terminal 10 is used to input relevant information at the start of work for adjusting a machine that processes a processing target, at the completion of such adjustment work, and at the completion of processing work. The results of these inputs are supplied to a support tool execution server 50 through a factory result collection PC 20 and a progress server 30. The support tool execution server 50 calculates the percentage of inputs actually made and causes a display 52 to display the calculated percentage, thereby making it viewable by factory workers.

17 Claims, 11 Drawing Sheets

(52) U.S. Cl.
CPC ........... *G05B 2219/31483* (2013.01); *G05B 2219/32145* (2013.01); *G05B 2219/32368* (2013.01); *Y02P 90/10* (2015.11); *Y02P 90/14* (2015.11); *Y02P 90/18* (2015.11); *Y02P 90/22* (2015.11)

(56) References Cited

U.S. PATENT DOCUMENTS

| | | | | |
|---|---|---|---|---|
| 2005/0119863 | A1* | 6/2005 | Buikema | G05B 19/4184 702/188 |
| 2009/0112343 | A1* | 4/2009 | Yuan | G05B 19/41865 700/101 |
| 2011/0213715 | A1* | 9/2011 | George | G06Q 10/04 705/301 |
| 2013/0096697 | A1* | 4/2013 | Frazer | G05B 15/02 700/12 |
| 2013/0290234 | A1* | 10/2013 | Harris | G06N 5/022 706/46 |

FOREIGN PATENT DOCUMENTS

| | | |
|---|---|---|
| JP | 09-218898 A | 8/1997 |
| JP | 2000-322119 A | 11/2000 |
| JP | 2003-029812 A | 1/2003 |
| JP | 2004-289679 A | 10/2004 |

OTHER PUBLICATIONS

International Preliminary Report on Patentability (Form PCT/IPEA/409) of Application No. PCT/JP2012/079714 dated May 15, 2015 (English translation) (4 pages).
International Search Report dated Jan. 29, 2013, issued in corresponding application No. PCT/JP2012/079714.

\* cited by examiner

| Setup start date and time | Setup completion date and time | Processing completion date and time | Determination A | Determination B | Determination C | Overall determination |
|---|---|---|---|---|---|---|
| 2012/5/31 | 2012/5/31 | 2012/6/1 | 1 | 1 | 1 | 111 |
| 2012/6/1 | 2012/6/1 | | 1 | 1 | 0 | 110 |
| 2012/5/30 | | 2012/5/30 | 1 | 0 | 1 | 101 |
| 2012/5/26 | | | 1 | 0 | 0 | 100 |
| | 2012/4/30 | 2012/5/1 | 0 | 1 | 1 | 011 |
| | 2012/5/30 | | 0 | 1 | 0 | 010 |
| | | 2012/6/1 | 0 | 0 | 1 | 001 |

Fig. 6

| Department /Process code | 111 | 110 | 101 | 100 | O11 | O10 | O01 | Total |
|---|---|---|---|---|---|---|---|---|
| A**1 | 93.65% | 2.20% | 3.76% | 0.38% | 0.00% | 0.00% | 0.00% | 100.00% |
| α***1 | 96.97% | 3.03% | 0.00% | 0.00% | 0.00% | 0.00% | 0.00% | 100.00% |
| α***2 | 100.00% | 0.00% | 0.00% | 0.00% | 0.00% | 0.00% | 0.00% | 100.00% |
| α***3 | 91.56% | 2.39% | 5.63% | 0.42% | 0.00% | 0.00% | 0.00% | 100.00% |
| α***4 | 93.20% | 1.20% | 4.40% | 1.20% | 0.00% | 0.00% | 0.00% | 100.00% |
| α***5 | 88.24% | 5.88% | 5.88% | 0.00% | 0.00% | 0.00% | 0.00% | 100.00% |
| α***6 | 93.10% | 3.32% | 3.05% | 0.54% | 0.00% | 0.00% | 0.00% | 100.00% |
| α***7 | 96.05% | 1.04% | 2.64% | 0.28% | 0.00% | 0.00% | 0.00% | 100.00% |
| α***8 | 96.86% | 0.00% | 3.14% | 0.00% | 0.00% | 0.00% | 0.00% | 100.00% |
| α***9 | 75.00% | 0.00% | 25.00% | 0.00% | 0.00% | 0.00% | 0.00% | 100.00% |
| α***10 | 96.15% | 3.85% | 0.00% | 0.00% | 0.00% | 0.00% | 0.00% | 100.00% |
| α***11 | 94.34% | 3.19% | 2.30% | 0.18% | 0.00% | 0.00% | 0.00% | 100.00% |
| A**2 | 100.00% | 0.00% | 0.00% | 0.00% | 0.00% | 0.00% | 0.00% | 100.00% |
| β***1 | 100.00% | 0.00% | 0.00% | 0.00% | 0.00% | 0.00% | 0.00% | 100.00% |
| β***2 | 100.00% | 0.00% | 0.00% | 0.00% | 0.00% | 0.00% | 0.00% | 100.00% |
| β***3 | 100.00% | 0.00% | 0.00% | 0.00% | 0.00% | 0.00% | 0.00% | 100.00% |
| β***4 | 100.00% | 0.00% | 0.00% | 0.00% | 0.00% | 0.00% | 0.00% | 100.00% |
| β***5 | 100.00% | 0.00% | 0.00% | 0.00% | 0.00% | 0.00% | 0.00% | 100.00% |
| β***6 | 100.00% | 0.00% | 0.00% | 0.00% | 0.00% | 0.00% | 0.00% | 100.00% |
| β***7 | 100.00% | 0.00% | 0.00% | 0.00% | 0.00% | 0.00% | 0.00% | 100.00% |
| β***8 | 100.00% | 0.00% | 0.00% | 0.00% | 0.00% | 0.00% | 0.00% | 100.00% |
| β***9 | 100.00% | 0.00% | 0.00% | 0.00% | 0.00% | 0.00% | 0.00% | 100.00% |

Fig. 7

| Setup start date and time | Setup completion date and time | Processing completion date and time | Net setup time (Minute) | Net process-ing time (Minute) | Net Setup mark | Net process-ing mark | Setup process-ing pattern |
|---|---|---|---|---|---|---|---|
| 2012/5/31 21:36 | 2012/5/31 21:37 | 2012/6/1 17:13 | 01 | 1176 | 1 | 1 | 11 |
| 2012/6/1 8:48 | 2012/6/1 10:07 | 2012/6/1 10:07 | 79 | 00 | 1 | 0 | 10 |
| 2012/6/1 9:24 | 2012/6/1 9:24 | 2012/6/1 16:36 | 00 | 432 | 0 | 1 | 01 |
| 2012/6/1 10:03 | 2012/6/1 10:03 | 2012/6/1 10:03 | 00 | 00 | 0 | 0 | 00 |

Fig. 9

| Department /Process code | 11 | 10 | 01 | 00 | Total |
|---|---|---|---|---|---|
| A**1 | 85.40% | 4.09% | 9.91% | 0.59% | 100.00% |
| α***1 | 72.73% | 0.00% | 27.27% | 0.00% | 100.00% |
| α***2 | 100.00% | 0.00% | 0.00% | 0.00% | 100.00% |
| α***3 | 87.63% | 5.84% | 6.11% | 0.42% | 100.00% |
| α***4 | 92.40% | 4.40% | 2.80% | 0.40% | 100.00% |
| α***5 | 84.31% | 5.88% | 9.80% | 0.00% | 100.00% |
| α***6 | 90.23% | 3.05% | 6.72% | 0.00% | 100.00% |
| α***7 | 86.55% | 2.77% | 10.68% | 0.00% | 100.00% |
| α***8 | 93.73% | 3.14% | 3.14% | 0.00% | 100.00% |
| α***9 | 7.69% | 30.77% | 26.92% | 34.62% | 100.00% |
| α***10 | 80.00% | 0.00% | 20.00% | 0.00% | 100.00% |
| α***11 | 90.00% | 2.50% | 7.50% | 0.00% | 100.00% |
| | | | | | |
| A**2 | 88.28% | 3.01% | 8.37% | 0.34% | 100.00% |
| β***1 | 98.20% | 0.13% | 1.54% | 0.13% | 100.00% |
| β***2 | 97.84% | 0.10% | 2.06% | 0.00% | 100.00% |
| β***3 | 98.09% | 0.00% | 1.91% | 0.00% | 100.00% |
| β***4 | 96.99% | 0.00% | 3.01% | 0.00% | 100.00% |
| β***5 | 64.60% | 31.37% | 3.73% | 0.31% | 100.00% |
| β***6 | 70.59% | 0.00% | 17.65% | 11.76% | 100.00% |
| β***7 | 97.71% | 0.30% | 1.98% | 0.00% | 100.00% |
| β***8 | 91.79% | 0.34% | 7.53% | 0.34% | 100.00% |
| β***9 | 58.36% | 2.21% | 38.59% | 0.84% | 100.00% |

Fig. 10

MANUFACTURING PROCESS MANAGEMENT SUPPORT DEVICE

TECHNICAL FIELD

The present invention relates to a manufacturing process management support device, and more particularly to, a manufacturing process management support device capable of increasing the reliability of result information.

BACKGROUND ART

A management support device of the above-described type proposed, for instance, in Patent Literature 1 uses a portable terminal as an input means having a storage device for storing the name of a person, the time of work, and the description of work. Unlike a case where a desktop computer or other personal computer is used, the use of such a portable terminal permits each worker to input result information in real time.

CITATION LIST

Patent Literature

Patent Literature 1: Japanese Unexamined Patent Application Publication No. 2003-29812 (Paragraph 0021, FIG. 2, etc.)

SUMMARY OF INVENTION

Technical Problem

However, even in a case where a portable terminal is used as an input means as mentioned above, the inventors of the present invention have found that the reliability of result information, which is input and collected, is not necessarily high. The reliability of the result information is not necessarily high because the result information is not input in a predicted manner.

The present invention has been made to address the above problem. An object of the present invention is to provide a manufacturing process management support device that is equipped with an input means for entering information about work to be performed in relation to a manufacturing process and capable of increasing the reliability of result information.

Solution to Problem and Advantageous Effects of Invention

A manufacturing process management support device according to the present invention includes a determination means and a notification means. This makes it possible to notify the outside whether or not information is input in a predicted manner. Further, the notified information can be fed back to a worker to create a situation where the worker is prompted to improve the manner of entering the information. This will lead to an increase in the reliability of result information.

Also, the manufacturing process management support device includes a collection processing means. Therefore, the manufacturing process management support device makes it possible to notify a determination result concerning multiple inputs instead of notifying each one of determination results concerning inputs of the same type. Meanwhile, in a case where inputs of the same type are frequently made, information indicating the total number and the ratio of inputs made in a predicted manner and of inputs made in an unpredicted manner is particularly more effective for evaluating the reliability of result collection than information indicating whether or not individual inputs are made in a predicted manner. In this respect, in a case where inputs of the same type are frequently made, the manufacturing process management support device according to the present invention makes it possible to notify information that is particularly useful for result collection.

Also, the manufacturing process management support device defines a target to be determined by the determination means. Therefore, the manufacturing process management support device makes it possible to determine whether inputs closely related to each other are made collectively in a predicted manner and to notify a determination result. Further, the manufacturing process management support device collectively handles the determination results of inputs concerning adjustment work and processing work, which form a pair of pieces of work related to each other in a manufacturing process. Therefore, the manufacturing process management support device makes it easy to evaluate the reliability of result collection.

The manufacturing process management support device according to the present invention causes the determination means to use a method of focusing attention on the fact that the result of an input made in a predicted manner may differ from the result of an input made in an unpredicted manner. Therefore, the manufacturing process management support device according to the present invention not only provides the advantageous effects of the manufacturing process management support device according to the present invention, but also makes it possible to determine in accordance with information underivable from inputs of one type whether or not inputs are made in a predicted manner.

The manufacturing process management support device according to the present invention causes the determination means to use a method of determining in a binary manner whether each input is actually made. Therefore, the manufacturing process management support device according to the present invention not only provides the advantageous effects of the manufacturing process management support device according to the present invention, but also makes it possible to notify the outside of an input that is not actually made.

Even if the time required for work may vary, the manufacturing process management support device according to the present invention focuses attention on the fact that the variation of the time required for work is within a certain range defined by the work as far as the work is properly performed. Therefore, the manufacturing process management support device according to the present invention not only provides the advantageous effects of the manufacturing process management support device according to the present invention, but also makes it possible to determine in accordance with the time required for work whether or not an input is made in a predicted manner.

Even if the time required for work may vary, the manufacturing process management support device according to the present invention focuses attention on the fact that the variation of the time required for work is within a certain range defined by the work as far as the work is properly performed. In this instance, a normal range is naturally defined for the time difference between start times and for the time difference between end times, which correspond to different processing targets handled during work of the same type. When, in view of the above respect, a process is performed to determine whether or not the time difference between input times is not smaller than a determination value, the manufacturing process management support device according to the present invention not only provides the advantageous effects of the manufacturing process management support device according to the present invention, but also makes it possible to properly determine whether or not an input is made in a predicted manner.

The manufacturing process management support device according to the present invention collectively handles the determination results of inputs concerning adjustment work and processing work, which form a pair of pieces of work related to each other in a manufacturing process. Therefore, the manufacturing process management support device according to the present invention not only provides the advantageous effects of the manufacturing process management support device according to the present invention, but also makes it easy to evaluate the reliability of result collection.

The manufacturing process management support device according to the present invention commonly handles inputs concerning the completion of setup and the start of processing because they occur at substantially the same time. Therefore, the manufacturing process management support device according to the present invention not only provides the advantageous effects of the manufacturing process management support device according to the present invention, but also simplifies input work and the contents of notice.

The manufacturing process management support device according to the present invention notifies the ratio between work performed in a predicted manner and work performed in an unpredicted manner. Therefore, the manufacturing process management support device according to the present invention not only provides the advantageous effects of the manufacturing process management support device according to the present invention, but also makes it possible to properly notify information particularly useful for result collection in a case where inputs of the same type are frequently made.

The manufacturing process management support device according to the present invention outputs data for visually displaying the ratio concerning each manufacturing process. Therefore, the manufacturing process management support device according to the present invention not only provides the advantageous effects of the manufacturing process management support device according to the present invention, but also makes it possible to visually display the ratio. Consequently, the reliability of result collection concerning each manufacturing process can be evaluated with ease.

BRIEF DESCRIPTION OF DRAWINGS

FIG. 6 shows representation method of determination result.

FIG. 7 shows an example of a notification process.

FIG. 9 shows representation method of determination result.

FIG. 10 shows an example of a notification process.

DESCRIPTION OF EMBODIMENTS

First Embodiment

A manufacturing process management support device according to a first embodiment of the present invention will now be described below with reference to the accompanying drawings.

Figure 1:
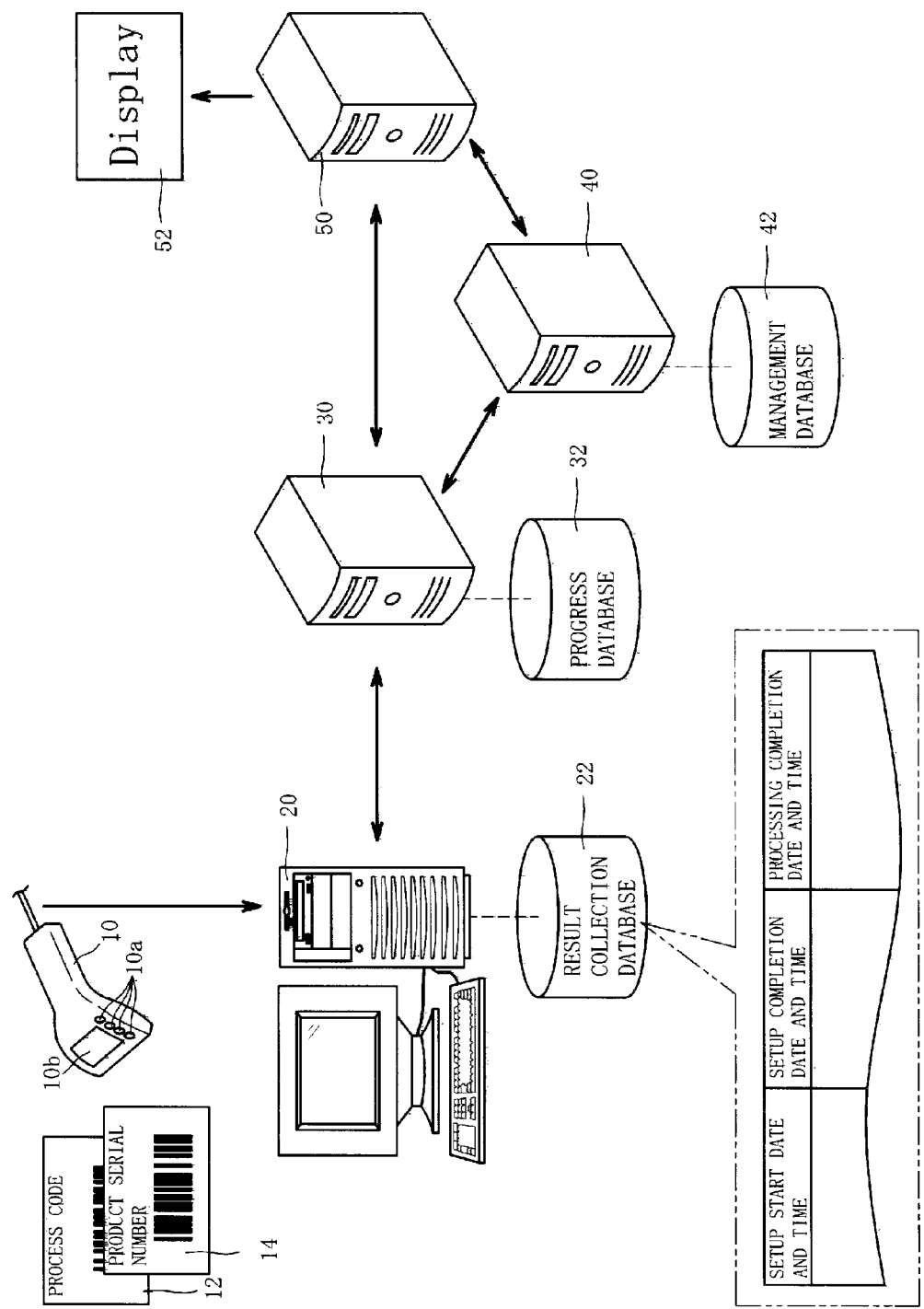
FIG. 1 shows the configuration of a system according to the first embodiment.

FIG. 1 shows the configuration of a system according to the first embodiment. The system includes not only devices in a factory for manufacturing a product, but also a hardware means capable of communicating with the devices.

The factory for manufacturing a product is equipped with a handy terminal 10 shown in FIG. 1. The handy terminal 10 is an input means for inputting the result of work performed during each manufacturing process for the product. Each manufacturing process includes work for adjusting a member (processing machine) used to process a processing target and work for processing the processing target. Relevant information is input to the handy terminal 10 at the beginning of adjustment work, at the completion of the adjustment work, and at the completion of processing work. Here, it is assumed that the completion of the adjustment work coincides with the beginning of the processing work. Therefore, a single input operation is performed to input information about the completion of the adjustment work and the beginning of the processing work.

The handy terminal 10 is capable of functioning as a barcode scanner. The handy terminal 10 includes an operating means (input buttons 10a) and a display section (display 10b). The input buttons 10a are operated to select a function of the handy terminal 10. The display 10b presents, for example, a selected function to the outside.

Meanwhile, a process code table 12 and a manufacturing order card 14 are given to each manufacturing process. A one-dimensional code indicative of a specific manufacturing process is written on the process code table 12. A one-dimensional code indicative of the number (product serial number) of a processing target or a processing target group (lot) is written on the manufacturing order card 14.

A worker operates an input button 10a on the handy terminal 10 at the beginning of adjustment work, at the completion of adjustment work, or at the completion of processing work to indicate the beginning of adjustment work, the completion of adjustment work, or the completion of processing work, and then uses the handy terminal 10 to read the one-dimensional codes. This is a work-specific input sequence.

The handy terminal 10 is also capable of inputting the type of a defect and the number of defective products when defective products are encountered during work, and is further capable of inputting the number of normally processed processing targets (non-defective products).

Data input from the handy terminal 10 is transmitted to the hardware means (factory result collection PC 20) disposed in a factory. The factory result collection PC 20 includes a computation means and a result collection database 22, which is a collection of result data generated in accordance with an input signal from the handy terminal 10.

The result collection database 22 is a file management system that is formed of a storage means built in the factory result collection PC 20.

The factory result collection PC 20 disposed in each factory is capable of communicating with a progress server 30. The progress server 30 includes a computation means and a progress database, which stores data for managing the progress. The progress database is a file management system that is formed of a storage means built in the progress server 30. The data for managing the progress is generated by a computation performed by the computation means. Even when data to be input through the handy terminal 10 is not input, the present embodiment permits an administrator to manually input the data through the progress sever 30.

A core server 40 is the most upstream hardware computation processing means for managing a manufacturing process. The core server 40 includes a management database 42 for storing data concerning various management tasks. The management database 42 is a file management system that is formed of a storage means built in the core server 40.

A support tool execution server 50 communicates with the progress server 30 and with the core server 40 to perform a process of supporting a result collection process. In the present embodiment, the support tool execution server 50 acts as the manufacturing process management support device. The support tool execution server 50 is capable of outputting data concerning a computation result to a display 52. This permits the display 52 to display the computation result. In the present embodiment, it is assumed that the display 52 is disposed in each factory to allow workers in each factory to view the computation result.

First of all, an input process performed when work is to be performed by a worker will now be described below in accordance with actual steps performed by the worker.

Figure 2:
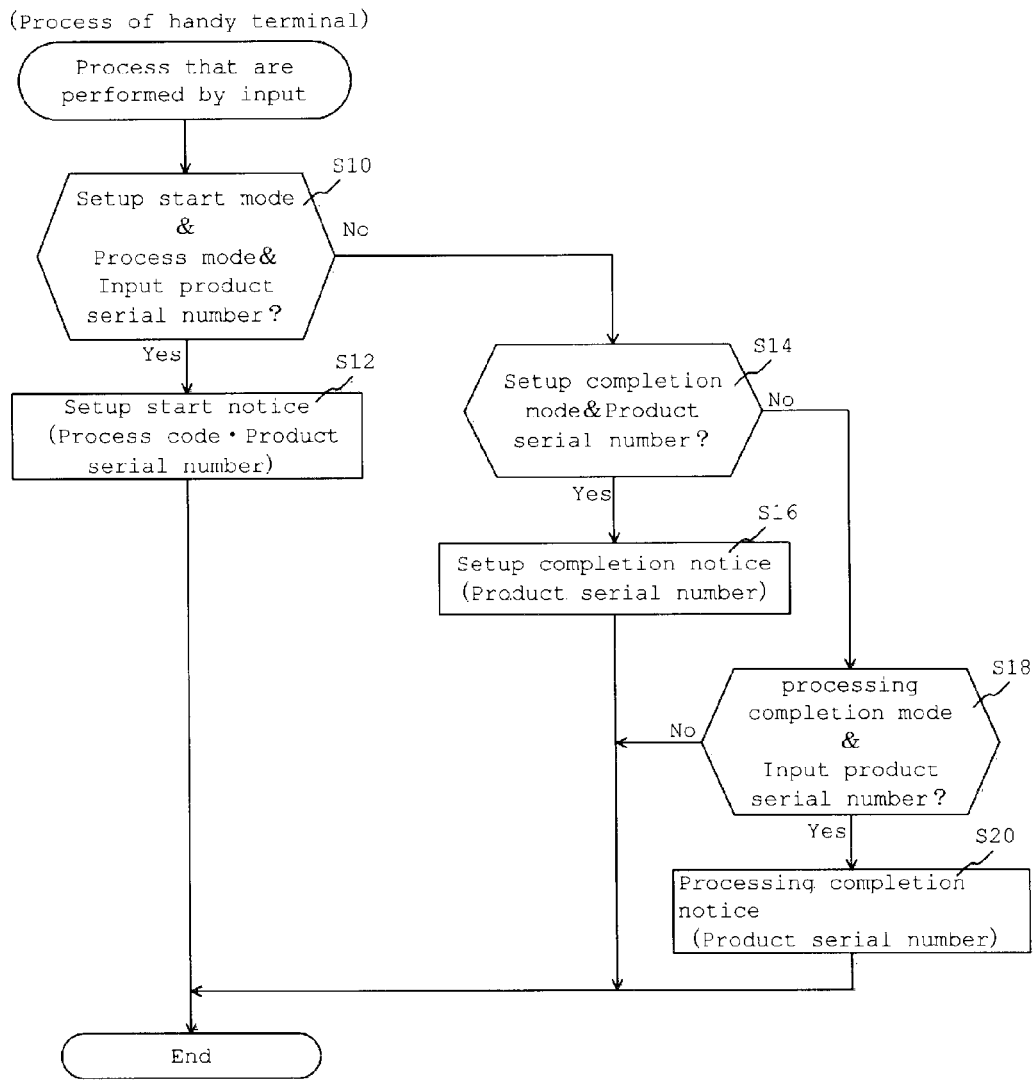
FIG. 2 shows processing steps made from the handy terminal.

FIG. 2 shows processing steps that are performed when an input is made from the handy terminal 10. The processing steps are repeatedly performed, for example, at predetermined intervals.

[At the Beginning of Adjustment Work (at the Beginning of Setup)]

Here, first of all, the worker selects a setup start mode by operating an input button 10*a* on the handy terminal 10. This causes the display 10*b* to display information indicative of the setup start mode. After the setup start mode is selected, the worker allows the handy terminal 10 to read a one-dimensional code on the process code table 12 shown in FIG. 1, and then allows the handy terminal 10 to read a one-dimensional code indicative of a related product serial number that is written on the manufacturing order card 14. The above process is to be performed by the worker at the beginning of setup.

In response to the above process, step S10 is performed to determine whether or not the logical AND of the selection of the setup start mode, the input of a process code, and the input of the product serial number is true. When the above process, which is to be performed at the beginning of setup, is performed, the query in step S10 is answered "YES" and processing proceeds to step S12. In step S12, the factory result collection PC 20 is notified of the fact that setup is associated with the process code and product serial number and started.

[At the Completion of Adjustment Work (at the Completion of Setup)]

Here, the worker selects a setup completion mode by operating an input button 10*a* on the handy terminal 10. This causes the display 10*b* to display information indicative of the setup completion mode. After the setup completion mode is selected, the worker allows the handy terminal 10 to read a one-dimensional code indicative of the related product serial number that is written on the manufacturing order card 14 shown in FIG. 1. The above process is to be performed by the worker at the completion of setup.

In response to the above process, step S14 is performed to determine whether or not the logical AND of the selection of the setup completion mode and the input of the product serial number is true. When the above process, which is to be performed at the completion of setup, is performed, the query in step S14 is answered "YES" and processing proceeds to step S16. In step S16, the factory result collection PC 20 is notified of the fact that setup is associated with the product serial number and completed.

[At the Completion of Processing Work]

Here, the worker selects a processing completion mode by operating an input button 10*a* on the handy terminal 10. This causes the display 10*b* to display information indicative of the processing completion mode. After the processing completion mode is selected, the worker allows the handy terminal 10 to read a one-dimensional code indicative of the related product serial number that is written on the manufacturing order card 14 shown in FIG. 1. The above process is to be performed by the worker at the completion of processing.

In response to the above process, step S18 is performed to determine whether or not the logical AND of the selection of the processing completion mode and the input of the product serial number is true. When the above process, which is to be performed at the completion of processing, is performed, the query in step S18 is answered "YES" and processing proceeds to step S20. In step S20, the factory result collection PC 20 is notified of the fact that processing work is associated with the product serial number and completed.

Meanwhile, if, as shown in FIG. 2, the query in step S10 is answered "NO", processing proceeds to step S14, and if the query in step S14 is answered "NO", processing proceeds to step S18. Further, when processing step S12, S16, or S20 is completed or when the query in step S18 is answered "NO", the above-described processing sequence comes to an end.

Figure 3:
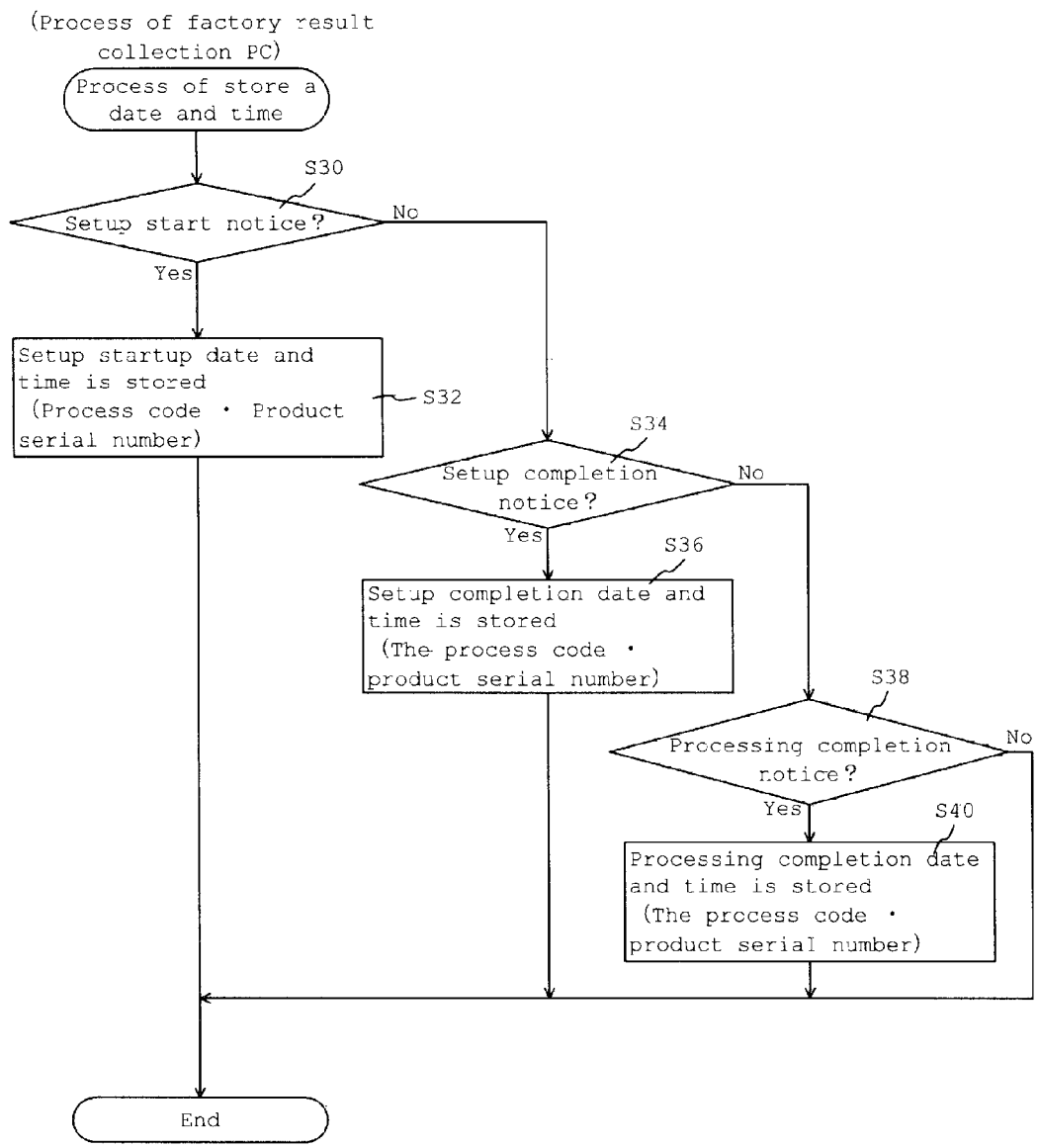
FIG. 3 shows processing steps of result collection.

FIG. 3 shows processing steps that are performed by the factory result collection PC 20 to store a date and time. The processing steps are repeatedly performed, for example, at predetermined intervals.

In the processing sequence shown in FIG. 3, first of all, step S30 is performed to determine whether or not a setup start notice is transmitted from the handy terminal 10. If it is determined that the setup start notice is transmitted from the handy terminal 10, processing proceeds to step S32. In step S32, the result collection database 22 shown in FIG. 1 stores a setup start date and time in association with the process code and product serial number. More specifically, the above process includes a process of receiving the setup start notice and regarding the date and time of setup start notice reception as the setup start date and time and a process of associating the setup start date and time with the process code and product serial number and storing the setup start date and time.

Meanwhile, if the query in step S30 is answered "NO", processing proceeds to step S34. Step S34 is performed to determine whether or not a setup completion notice is transmitted from the handy terminal 10. If it is determined that the setup completion notice is transmitted, processing proceeds to step S36. In step S36, the result collection database 22 shown in FIG. 1 stores a setup completion date and time in association with the process code and product serial number. More specifically, the above process includes a process of receiving the setup completion notice and regarding the date and time of setup completion notice reception as the setup completion date and time and a process of associating the setup completion date and time with the process code and product serial number and storing the setup completion date and time. In step S16, which is shown in FIG. 2, the process code is not output. Therefore, the last process code output from the same handy terminal 10 is recognized as a current process code.

Meanwhile, if the query in step S34 is answered "NO", step S38 is performed to determine whether or not a processing completion notice is transmitted from the handy terminal 10. When it is determined that the processing completion notice is transmitted from the handy terminal 10, processing proceeds to step S40. In step S40, the result collection database 22 shown in FIG. 1 stores a processing completion date and time in association with the product serial number. More specifically, the above process includes a process of receiving the processing completion notice and regarding the date and time of processing completion notice reception as the processing completion date and time and a process of associating the processing completion date and time with the product serial number and storing the processing completion date and time. In step S20, which is shown in FIG. 2, the process code is not output. Therefore, the last process code output from the same handy terminal 10 is recognized as a current process code.

When processing step S32, S36, or S40 is completed or when the query in step S38 is answered "NO", the above-described processing sequence comes to an end.

If the worker fails to perform an input process for the beginning of setup and then performs an input process for the completion of setup, the setup completion date and time derived from the input process cannot be associated with the process code. In this instance, the setup completion date and time is provisionally associated with a completed process for a processing target identified by the product serial number. If, for instance, two different sets of a setup completion date and time are stored for the same process code, one of the two sets is handled as an error so that the administrator identifies the process code with which the erroneous setup completion date and time is associated. Relevant data is then corrected through the progress server 30. Further, if such identification is difficult to achieve, for example, one of the two different sets of a setup completion date and time may be deleted or otherwise processed.

Figure 4:
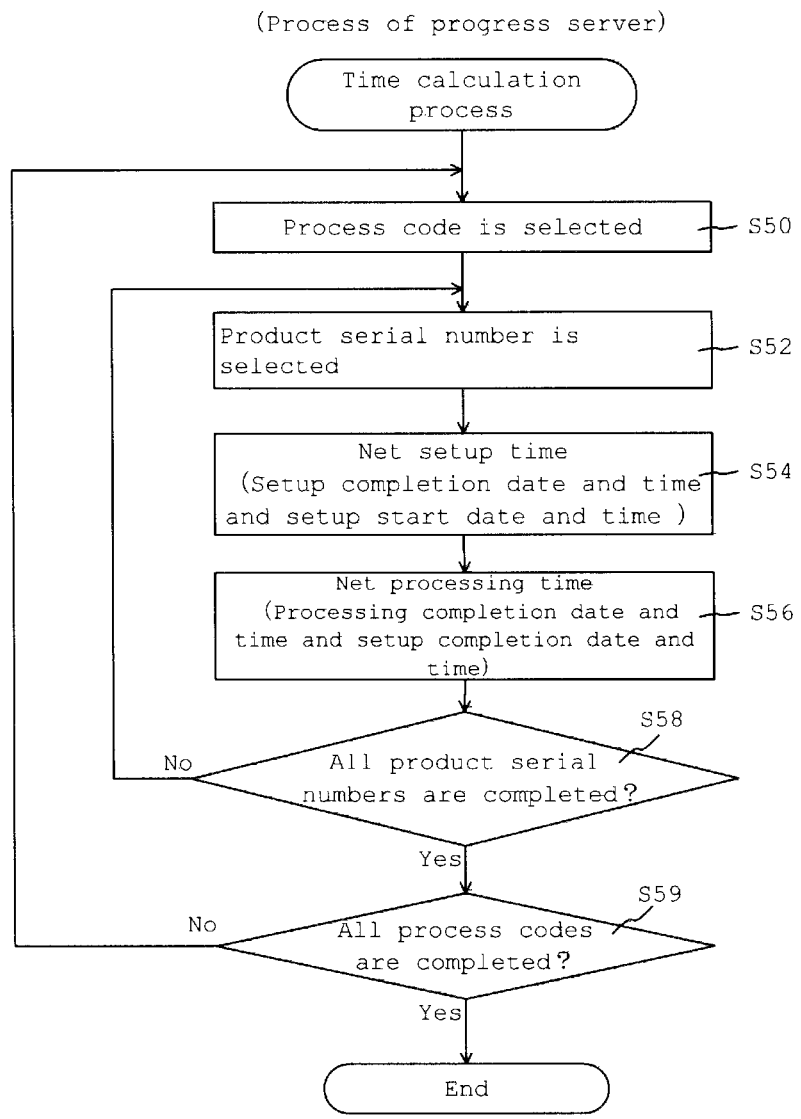
FIG. 4 shows a processing steps of calculation process of work time.

FIG. 4 shows a part of a process performed by the progress server 30, or more specifically, processing steps (time calculation process) performed to process data included in the result collection database that is generated by the factory result collection PC 20. The processing steps are repeatedly performed, for example, at predetermined intervals (for example, at 24-hour intervals).

In step S50, which is the first step of a series of the processing steps, a process code is selected. In the next step, which is step S52, a product serial number is selected. In the next step, which is step S54, a net setup time is calculated in accordance with the setup start date and time and setup completion date and time that are determined by the process code and product serial number. In this step, first of all, the factory result collection PC 20 is notified of the process code and product serial number. The factory result collection PC 20 then accesses the result collection database 22, reads the setup start date and time and setup completion date and time that are determined by the process code and product serial number, and transmits data concerning the read setup start date and time and setup completion date and time to the progress server 30. When such a transmission process is performed, the data concerning the setup start date and time and setup completion date and time is received. The setup completion date and time and setup start date and time are then written in an appropriate manner. Eventually, the difference between the setup completion date and time and the setup start date and time is computed to calculate the net setup time.

In the next step, which is step S56, a net processing time is calculated in accordance with the setup completion date and time and processing completion date and time that are determined by the process code and product serial number. In this step, first of all, the factory result collection PC 20 is notified of the process code and product serial number. The factory result collection PC 20 then accesses the result collection database 22, reads the setup completion date and time and processing completion date and time that are determined by the process code and product serial number, and transmits data concerning the read setup completion date and time and processing completion date and time to the progress server 30. When such a transmission process is performed, the data concerning the setup completion date and time and processing completion date and time is received. The processing completion date and time and setup completion date and time are then written in an appropriate manner. Eventually, the difference between the processing completion date and time and the setup completion date and time is computed to calculate the net processing time.

Next, step S58 is performed to determine whether or not processing steps S54 and S56 are completed for all product serial numbers related to the process code selected in step S50. If the query in step S58 is answered "NO", processing returns to step S52. If, on the other hand, the query in step S58 is answered "YES", step S59 is performed to determine whether or not processing steps S54 and S56 are completed for all process codes. If the query in step S59 is answered "NO", processing returns to step S50. If, on the other hand, the query in step S59 is answered "YES", the above-described processing sequence comes to an end.

Figure 5:
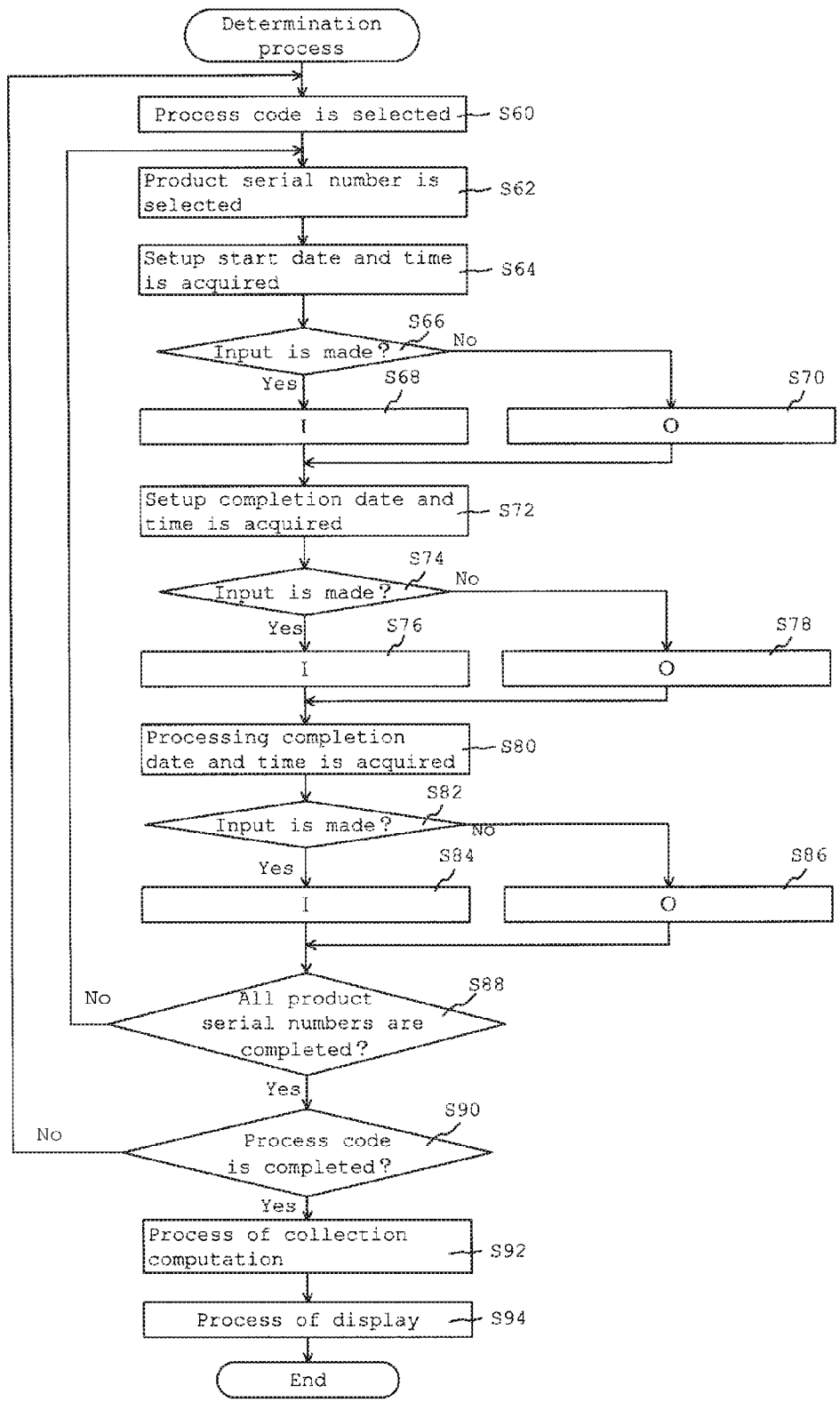
FIG. 5 shows processing steps of determination process of input result.

FIG. 5 shows processing steps (determination process) performed by the support tool execution server 50. The processing steps are repeatedly performed, for example, at predetermined intervals (for example, at 24-hour intervals).

In step S60, which is the first step of a series of the processing steps, a process code is selected. In the next step, which is step S62, a product serial number is selected. Next, step S64 is performed to acquire a setup start date and time that is determined by the process code selected in step S60 and the product serial number selected in step S62. More specifically, in this processing step, the process code and product serial number are specified to prompt for the transmission of data about the setup start date and time and allow the factory result collection PC 20 to receive the data through the progress server 30. However, if no setup start input is made in accordance with the selected process code and product serial number, the data about the setup start date and time will not be transmitted to the support tool execution server 50. In this instance, for example, the factory result collection PC 20 should notify the support tool execution server 50 through the progress server 30 that an input concerning a setup start is not made. In the present embodiment, this processing step constitutes an input result acquisition means.

Next, step S66 is performed to determine whether or not a setup start for the selected process code and product serial number is input. If the query in step S66 is answered "YES", processing proceeds to step S68. In step S68, the symbol I is given to an input result concerning the setup start for the selected process code and product serial number. If, on the other hand, the query in step S66 is answered "NO", processing proceeds to step S70. In step S70, the symbol O is given to the input result concerning the setup start for the selected process code and product serial number. Here, it is assumed that processing steps S60 and S62 are performed to select a code and number for specifying a process and product for which processing is already completed. Therefore, it is assumed that an input concerning the setup start is made. Thus, the symbol I is given when a predicted input is made, and the symbol O is given when the predicted input is not made. In the present embodiment, processing steps S66 to S70 constitute a determination means.

Upon completion of step S68 or S70, processing proceeds to step S72. Step S72 is performed to acquire a setup completion date and time that is determined by the process code selected in step S60 and the product serial number selected in step S62. More specifically, in this processing step, the process code and product serial number are specified to prompt for the transmission of data about the relevant setup completion date and time and allow the factory result collection PC 20 to receive the data through the progress server 30. However, if no setup completion input is made in accordance with the selected process code and product serial number, the data about the setup completion date and time will not be transmitted to the support tool execution server 50. In this instance, for example, the factory result collection PC 20 should notify the support tool execution server 50 through the progress server 30 that an input concerning a setup completion is not made. In the present embodiment, this processing step constitutes the input result acquisition means.

Next, step S74 is performed to determine whether or not a setup completion for the selected process code and product serial number is input. If the query in step S74 is answered "YES", processing proceeds to step S76. In step S76, the symbol I is given to an input result concerning the setup completion for the selected process code and product serial number. If, on the other hand, the query in step S74 is answered "NO", processing proceeds to step S78. In step S78, the symbol O is given to the input result concerning the setup completion for the selected process code and product serial number. Here, the symbol I is given when a predicted input is made, and the symbol O is given when the predicted input is not made. In the present embodiment, processing steps S74 to S78 constitute the determination means.

Upon completion of step S76 or S78, processing proceeds to step S80. Step S80 is performed to acquire a processing completion date and time that is determined by the process code selected in step S60 and the product serial number selected in step S62. More specifically, in this processing step, the process code and product serial number are specified to prompt for the transmission of data about the relevant processing completion date and time and allow the factory result collection PC 20 to receive the data through the progress server 30. However, if no processing completion input is made in accordance with the selected process code and product serial number, the data about the processing completion date and time will not be transmitted to the support tool execution server 50. In this instance, for example, the factory result collection PC 20 should notify the support tool execution server 50 that an input concerning a processing completion is not made. In the present embodiment, this processing step constitutes the input result acquisition means.

Next, step S82 is performed to determine whether or not a processing completion for the selected process code and product serial number is input. If the query in step S82 is answered "YES", processing proceeds to step S84. In step S84, the symbol I is given to an input result concerning the processing completion for the selected process code and product serial number. If, on the other hand, the query in step S82 is answered "NO", processing proceeds to step S86. In step S86, the symbol O is given to the input result concerning the processing completion for the selected process code and product serial number. Here, the symbol I is given when a predicted input is made, and the symbol O is given when the predicted input is not made. In the present embodiment, processing steps S82 to S86 constitute the determination means.

Upon completion of step S84 or S86, processing proceeds to step S88. Step S88 is performed to determine whether or not processing steps S64 to S86 are completed for all product serial numbers related to the process code selected in step S60. If the query in step S88 is answered "NO", processing returns to step S62. If, on the other hand, the query in step S88 is answered "YES", processing proceeds to step S90. Step S90 is performed to determine whether or not processing steps S62 to S86 are completed for all process codes. If the query in step S90 is answered "NO", processing returns to step S60 because a process of determining whether or not an input is made in a predicted manner is still not completed.

If, on the other hand, the query in step S90 is answered "YES", processing proceeds to step S92. In step S92, a computation process is performed. This computation process includes a process of collecting the above determination results concerning all process codes and product serial numbers for processed products. In the present embodiment, this processing step constitutes a collection computation means. In the next step, which is step S94, the display 52 shown in FIG. 1 is used to visually notify (display) the result of the computation process. In the present embodiment, this processing step constitutes a notification means.

Determination results indicating whether or not the inputs concerning the setup start, setup completion, and processing completion are made in a predicted manner are consolidated into an overall determination and written in the form of a three-component vector as illustrated in FIG. 6. Referring to FIG. 6, determination A represents a determination result of an input concerning a setup start, determination B represents a determination result of an input concerning a setup completion, and determination C represents a determination result of an input concerning a processing completion. Determinations A, B, and C respectively denote the first, second, and third components of the vector indicative of the overall determination. Incidentally, FIG. 6 shows a case where a setup completion date and time is registered although no relevant setup start date and time is registered. It means that the progress server 30 is operated by the administrator to manually correct an input in response to an error.

FIG. 7 shows an example of information displayed on the display 52. As shown in FIG. 7, the present embodiment displays the percentages of vectors ("III", "IIO", "IOI", "IOO", "OII", "OIO", and "OOI") indicative of overall determinations with respect to each process code ($\alpha$*1, $\alpha$*2, . . . , and $\alpha$*11, $\beta$*1, $\beta$*2, . . . , and $\beta$*9). Further, the present embodiment displays the percentages of the vectors with respect to each department (A1 or A2) that performs some processes. The example of FIG. 7 indicates that process codes $\alpha$*1, $\alpha$*2, . . . , and $\alpha$***11 are executed by department A\*\*1, and that process codes β\*\*\*1, β\*\*\*2, . . . , and β\*\*\*9 are executed by department A\*\*2.

As a visual display is given as described above, it is possible to very clearly recognize whether or not an input to be made with the handy terminal 10 is actually made. Therefore, if a situation where the input is not actually made frequently occurs, it is possible to work out measures to be taken in order to ensure that the input is actually made. If such measures are taken to produce intended results, it is possible to increase the reliability of the result of result collection concerning the net setup time and net processing time calculated by the process depicted in FIG. 4. The measures are not limited to those which improve, for example, work environment. In fact, the inventors of the present invention have verified that a substantial effect is produced (to raise probability from lower than 50% to approximately 90%) simply when the displayed information depicted in FIG. 7 is made viewable, for instance, by factory workers. It is conceivable that the measures taken have facilitated the awareness raising of workers and the spontaneous improvement of workers.

The present embodiment, which has been described above, provides the following advantageous effects.

(1) Whether or not an input concerning a setup start, an input concerning a setup completion, and an input concerning a processing completion are actually made is determined, and the result of determination is notified. Therefore, the notified information is fed back to a worker to create a situation where the worker is prompted to improve the method of input. This will lead to an increase in the reliability of result collection.

(2) Determination results about multiple input results (24-hour results are exemplified above) concerning a setup start, setup completion, and processing completion are collected and displayed. Therefore, in a situation where inputs of the same type are frequently made, it is possible to notify information particularly useful for result collection.

(3) Determinations about an input concerning a setup start, an input concerning a setup completion, and an input concerning a processing completion are collectively displayed. This makes it possible to simultaneously notify determination results about inputs closely related to each other.

(4) An input concerning a setup start and an input concerning a setup completion are made identical with each other. This simplifies input work and the contents of notice.

(5) The percentage of inputs made in a predicted manner (III) and the percentage of inputs made in an unpredicted manner (IIO, IOI, etc.) are notified. Therefore, in a situation where inputs of the same type are frequently made, it is possible to properly notify information particularly useful for result collection.

(6) Determination results indicating whether or not inputs are actually made are visually displayed for each manufacturing process. This makes it easy to evaluate the reliability of result collection for each manufacturing process.

(7) Determination results about inputs of different types (an input concerning a setup start, an input concerning a setup completion, and an input concerning a processing completion), which are made at timings close to each other in accordance with a manufacturing process, are written in binary notation and written as components of a vector. This makes it possible to present the determination results in a compact, easy-to-understand form.

Second Embodiment

A second embodiment of the present invention will now be described with reference to the accompanying drawings. The following description mainly deals with the difference between the first and second embodiments. Elements of the second embodiment that are identical with those of the first embodiment are designated by the same reference signs as those of the first embodiment and will not be redundantly described.

The second embodiment determines, in accordance with the relationship between an input concerning a setup start, an input concerning a setup completion, and an input concerning a processing completion, whether or not inputs are made in a predicted manner.

Figure 8:
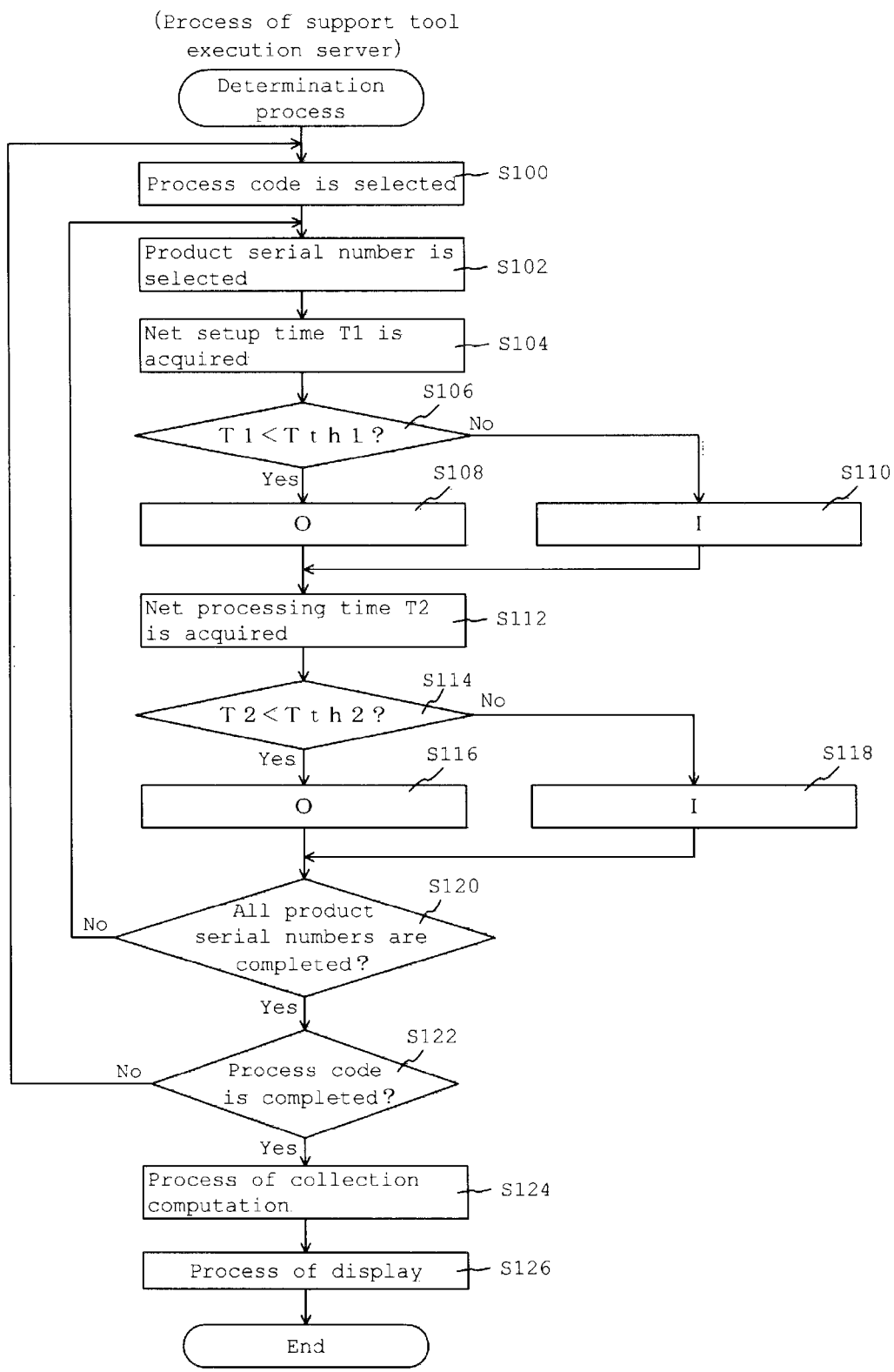
FIG. 8 shows processing steps of determination process of input result performed in the second embodiment.

FIG. 8 shows processing steps (determination process) performed in the present embodiment by the support tool execution server 50. The processing steps are repeatedly performed, for example, at predetermined intervals (for example, at 24-hour intervals).

In step S100, which is the first step of a series of the processing steps, a process code is selected. In the next step, which is step S102, a product serial number is selected. Next, step S104 is performed to acquire a net setup time T1 that is determined by the process code selected in step S100 and the product serial number selected in step S102. More specifically, in this processing step, the process code and product serial number are specified to prompt for the transmission of data about the relevant net setup time T1 and allow the progress server 30 to receive the data. However, if the net setup time T1 related to the selected process code and product serial number does not exist, the data about the net setup time T1 will not be transmitted to the support tool execution server 50. In this instance, for example, the progress server 30 should notify the support tool execution server 50 that the net setup time T1 does not exist. In the present embodiment, processing step S104 constitutes the input result acquisition means. A situation where the net setup time T1 does not exist occurs when at least one of an input concerning a setup start and an input concerning a setup completion is not made in accordance with the selected process code and product serial number.

Next, step S106 is performed to determine whether or not the net setup time T1 is less than a threshold value Tth1. The threshold value Tth1 is set to be not more than minimum time (for example, 1 minute) that is predictable as the setup time. This processing step is performed to determine whether or not an input concerning a setup start and an input concerning a setup completion are made in a predicted manner. In other words, when an input concerning a setup start is made and an input concerning the completion of adjustment work (a setup completion) is made, the time interval between these two inputs is the time required for adjustment work. It is conceivable that the time required for adjustment work is within a certain range even if the personal difference between workers is taken into account. Therefore, if the above-mentioned time interval is excessively short, it is conceivable that the inputs are not made at a proper timing. More specifically, in the above case, for example, an input concerning a setup completion is made subsequently to an input concerning a setup start and actual adjustment work and processing work are performed later.

If the query in step S106 is answered "YES", processing proceeds to step S108. In step S108, the symbol O is given to input results concerning the setup start and setup completion for the selected process code and product serial number. If, on the other hand, the query in step S106 is answered "NO", processing proceeds to step S110. In step S110, the symbol I is given to the input results concerning the setup start and setup completion for the selected process code and product serial number. Here, the symbol I is given when a predicted input is made, and the symbol O is given when the predicted input is not made. In the present embodiment, processing steps S106 to S110 constitute the determination means. If the net setup time T1 cannot be acquired in step S104, the query in step S106 should be answered "YES" to give the symbol O to the input results concerning the setup start and setup completion for the selected process code and product serial number.

Upon completion of step S108 or S110, processing proceeds to step S112. Step S112 is performed to acquire a net processing time T2 that is determined by the process code selected in step S100 and the product serial number selected in step S102. More specifically, in this processing step, the process code and product serial number are specified to prompt for the transmission of data about the relevant net processing time T2 and allow the progress server 30 to receive the data. However, if the net processing time T2 related to the selected process code and product serial number does not exist, the data about the net processing time T2 will not be transmitted to the support tool execution server 50. In this instance, for example, the progress server 30 should notify the support tool execution server 50 that the net processing time T2 does not exist. In the present embodiment, processing step S112 constitutes the input result acquisition means. A situation where the net processing time T2 does not exist occurs when at least one of an input concerning a setup completion and an input concerning a processing completion is not made in accordance with the selected process code and product serial number.

Next, step S114 is performed to determine whether or not the net processing time T2 is less than a threshold value Tth2. The threshold value Tth2 is set to be not less than minimum time (for example, 1 minute) that is predictable as the processing time. This processing step is performed to determine whether or not an input concerning a setup completion and an input concerning a processing completion are made in a predicted manner. In other words, when an input concerning a setup completion is made and an input concerning the completion of processing work is made, the time interval between these two inputs is the time required for processing work. It is conceivable that the time required for processing work is within a certain range even if the personal difference between workers is taken into account. Therefore, if the above-mentioned time interval is excessively short, it is conceivable that the inputs are not made at a proper timing. More specifically, in the above case, for example, an input concerning a processing completion is made subsequently to an input concerning a setup completion and actual processing work is performed later.

If the query in step S114 is answered "YES", processing proceeds to step S116. In step S116, the symbol O is given to input results concerning the setup completion and processing completion for the selected process code and product serial number. If, on the other hand, the query in step S114 is answered "NO", processing proceeds to step S118. In step S118, the symbol I is given to the input results concerning the setup completion and processing completion for the selected process code and product serial number. Here, the symbol I is given when a predicted input is made, and the symbol O is given when the predicted input is not made. In the present embodiment, processing steps S114 to S118 constitute the determination means. If the net processing time T2 cannot be acquired in step S112, the query in step S114 should be answered "YES" to give the symbol O to the input results concerning the setup completion and processing completion for the selected process code and product serial number.

Upon completion of step S116 or S118, processing proceeds to step S120. Step S120 is performed to determine whether or not processing steps S104 to S118 are completed for all product serial numbers with respect to the process code selected in step S100. If the query in step S120 is answered "NO", processing returns to step S102. If, on the other hand, the query in step S120 is answered "YES", processing proceeds to step S122. Step S122 is performed to determine whether or not processing steps S102 to S120 are completed for all process codes. If the query in step S122 is answered "NO", processing returns to step S100 because one or more process codes are still not checked to determine whether or not an input is made in a predicted manner.

If, on the other hand, the query in step S122 is answered "YES", processing proceeds to step S124. In step S124, a computation process is performed. This computation process includes a process of collecting the above determination results concerning all process codes and product serial numbers for processed products. In the present embodiment, this processing step constitutes the collection computation means. In the next step, which is step S126, the display 52 shown in FIG. 1 is used to visually notify (display) the result of the computation process. In the present embodiment, this processing step constitutes the notification means.

Determination results indicating whether or not a group of inputs concerning the setup start and setup completion and a group of inputs concerning the setup completion and processing completion are made in a predicted manner are consolidated into an overall determination (setup processing pattern) and written in the form of a two-component vector as illustrated in FIG. 9. Referring to FIG. 9, a net setup mark represents a determination result of the group of inputs concerning the setup start and setup completion (net setup time), and a net processing mark represents a determination result of the group of inputs concerning the setup completion and processing completion (net processing time). The net setup mark and net processing mark respectively denote the first and second components of the vector indicative of the setup processing pattern.

FIG. 10 shows an example of information displayed on the display 52. As shown in FIG. 10, the present embodiment displays the percentages of vectors ("II", "IO", "OI", and "OO") indicative of the setup processing pattern with respect to each process code ($\alpha$*1, $\alpha$*2, and $\alpha$*11, $\beta$*1, $\beta$*2, . . . , and $\beta$*9). Further, the present embodiment displays the percentages of the vectors with respect to each department (A1 or A2) that performs some processes. The example of FIG. 10 indicates that process codes $\alpha$*1, $\alpha$*2, . . . , and $\alpha$*11 are executed by department A1, and that process codes $\beta$*1, $\beta$*2, . . . , and $\beta$*9 are executed by department A2.

The present embodiment, which has been described above, provides the following advantageous effect in addition to advantageous effects (4) to (7) of the first embodiment.

(8) When the net setup time is excessively short, it is determined that the group of inputs concerning the setup start and setup completion is not made in a predicted manner. When the net processing time is excessively short, it is determined that the group of inputs concerning the setup completion and processing completion is not made in a predicted manner. This makes it possible to detect inputs that are made at an unpredicted timing.

Third Embodiment

A third embodiment of the present invention will now be described with reference to the accompanying drawings.

The following description mainly deals with the difference between the first and third embodiments. Elements of the third embodiment that are identical with those of the first embodiment are designated by the same reference signs as those of the first embodiment and will not be redundantly described.

Figure 11:
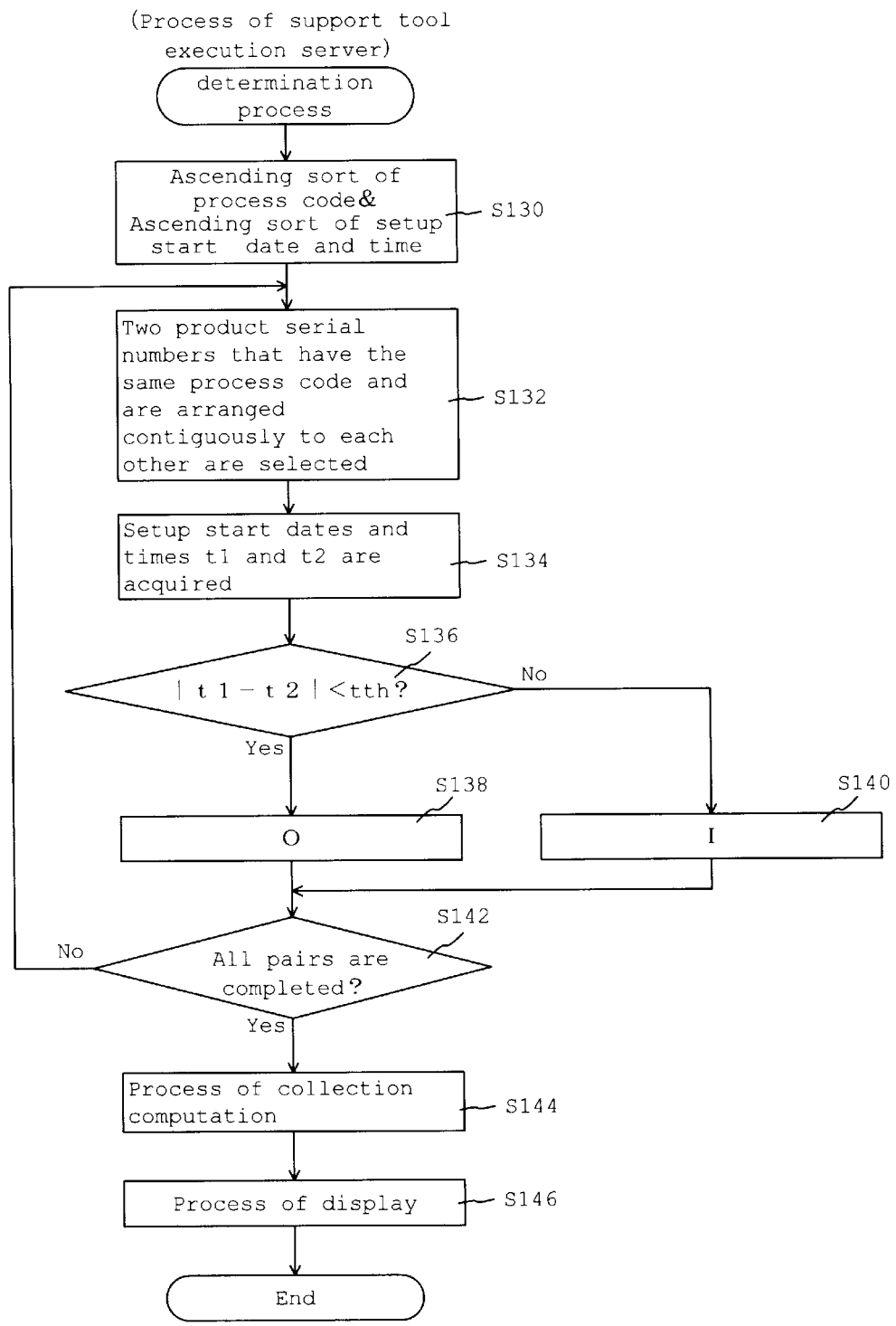
FIG. 11 shows processing steps of determination process of an input result performed in the third embodiment.

FIG. 11 shows processing steps performed in the present embodiment by the support tool execution server 50. The processing steps are repeatedly performed, for example, at predetermined intervals (for example, at 24-hour intervals).

In the processing sequence shown in FIG. 11, first of all, step S130 is performed to prioritize symbols indicative of the process codes, arrange them in order from the highest priority to the lowest, and arrange the relevant product serial numbers in order from the earliest setup start date and time to the latest. If some of the product serial numbers arranged in order from the earliest setup start date and time to the latest have the same setup start date and have the same process code, this processing step is performed to ensure that they are arranged contiguously to each other. More specifically, in this processing step, process codes are specified to prompt for the transmission of data about the setup start date and time and product serial number related to each process code and allow the factory result collection PC 20 to receive the data through the progress server 30. In the present embodiment, this processing step constitutes the input result acquisition means.

Next, step S132 is performed to select two product serial numbers that have the same process code and are arranged contiguously to each other within the above-mentioned arrangement. Next, step S134 is performed to acquire setup start dates and times t1 and t2 concerning the pair of product serial numbers selected in step S132.

Next, step S136 is performed to determine whether or not the absolute value of the difference between a pair of setup start dates and times t1 and t2 is smaller than a threshold value tth. This processing step is performed to determine whether or not inputs concerning setup starts are made in a predicted manner. It is predicted that a processing target or a group of processing targets (a lot), which is identified by a product serial number, is adjusted and processed, and that upon completion of such adjustment and processing, a processing target or a group of processing targets (a lot), which is identified by another product serial number, is adjusted and processed. It is conceivable that the time required for adjustment and processing varies from one worker to another, but is within a certain range. Therefore, if inputs of the same type (for example, inputs concerning a setup start) are made for different processing targets and the time interval between the setup start dates and times for the different processing targets is excessively short, it is conceivable that the inputs are not made in a predicted manner.

If the query in step S136 is answered "YES", processing proceeds to step S138. In step S138, the symbol O is given to the input results concerning the setup start for the selected process code and the selected pair of product serial numbers. If, on the other hand, the query in step S136 is answered "NO", processing proceeds to step S140. In step S140, the symbol I is given to the input results concerning the setup start for the selected process code and the selected pair of product serial numbers. Here, the symbol I is given when a predicted input is made, and the symbol O is given when the predicted input is not made. In the present embodiment, processing steps S136 to S140 constitute the determination means.

Upon completion of step S138 or S140, processing proceeds to step S142. Step S142 is performed to determine whether or not processing steps S134 to S140 are completed for all pairs of neighboring product serial numbers within the arrangement made in step S130. If the query in step S142 is answered "NO", processing returns to step S132. If, on the other hand, the query in step S142 is answered "YES", processing proceeds to step S144.

In step S144, the above determination results concerning all process codes and product serial numbers for processed products are collected to perform a computation process of calculating the number of products having the symbol I and the number of products having the symbol O with respect to the total number of processed products. In the present embodiment, this processing step constitutes the collection computation means. In the next step, which is step S146, the display 52 shown in FIG. 1 is used to visually notify (display) the result of the computation process. Here, for example, the number of products having the symbol O should be indicated for each process code. In the present embodiment, this processing step constitutes the notification means. If the pair of product serial numbers to be selected in step S132 is not found upon completion of step S130, the process shown in FIG. 11 comes to an immediate end.

The present embodiment, which has been described above, provides the following advantageous effect in addition to advantageous effects (4), (6), and (7) of the first embodiment.

(9) When the absolute value of the time difference between the setup start dates and times for different product serial numbers is excessively small, it is determined that the inputs are not made in a predicted manner. Therefore, even in a case where individual inputs are actually made, inputs made at an unpredicted timing can be detected. Even when inputs are made in an unpredicted manner, it does not always mean that a worker has made a mistake or failed to observe rules. If, for example, field conditions suggest that processing targets (a group of processing targets) related to different product serial numbers should be continuously processed after adjustment work by using an adjusted processing machine, inputs concerning the setup start for the different product serial numbers may be continuously made. When, in the above instance, such inputs are temporarily regarded as unpredicted inputs and field work is not performed in a manner predicted by result management personnel, it is possible to obtain an opportunity to recognize that the field work is not performed in a manner predicted by the result management personnel.

ALTERNATIVE EMBODIMENTS

Although the present invention has been described above with respect to some specific embodiments, it is easily inferable that the present invention is not limited to the above-described embodiments, but may be variously modified for improvement without departing from the scope of the present invention. Exemplary modifications will now be described below.

[Inputs of Different Types of Work Performed at Timings Close to Each Other in Accordance with a Manufacturing Process]

Input results are not limited to those concerning the start of adjustment work, the completion of adjustment work, and the completion of processing work. Instead, the input results may be those concerning, for example, the start of adjustment work, the completion of adjustment work, the start of processing work, and the completion of processing work.

[Determination Means]

For example, the process according to the first embodiment (FIG. 5) and the process according to the second embodiment (FIG. 8) may be combined. Further, the process according to the third embodiment (FIG. 11) may be combined with the processes according to the first and second embodiments.

Even if the net setup time T1 and net processing time T2 are excessively long in the second embodiment (FIG. 8), the symbol O may be given to an unpredicted input. However, if processing work is performed over two successive days and the work time in a factory is shorter than 24 hours, the time outside working hours should be excluded from consideration. This may be accomplished, for instance, by allowing the progress server 30 to store information about the working hours as data, determine whether or not a setup start date is different from a setup completion date, and exclude the time outside the working hours from consideration if the setup start date is different from the setup completion date.

In the third embodiment (FIG. 11), the time interval between setup completion dates and times and the time interval between processing completion dates and times may be checked instead of the time interval between setup start dates and times to determine whether they are excessively short.

In each of the first to third embodiments, all input results are sorted into one of two different categories by using the symbol I when an input is made in a predicted manner and using the symbol O when an input is made in an unpredicted manner. However, the present invention is not limited to such embodiments. For example, a gray zone may be additionally used so that the determination results produced by the determination means are expressed by using a three-valued logic system. This may be accomplished, for instance, by using two threshold values different from the net processing time for comparison purposes and sorting the input results into the "unpredicted", "gray", and "predicted" categories in order from the shortest period of time to the longest.

[Collection Processing Means]

The first embodiment (FIG. 7) and the second embodiment (FIG. 10) calculate the percentage of inputs made in a predicted manner (III and II) to a parameter (the sum of inputs made in a predicted manner and inputs made in an unpredicted manner) and calculate the percentage of inputs made in an unpredicted manner (IIO, IOI, etc.) on an individual input type basis. However, the present invention is not limited to such calculations. For example, only the percentage of inputs made in a predicted manner may be calculated. Further, in the first embodiment (FIG. 7), the percentages of "IIO", "IOI", "IIO", "OII", "OIO", and "OOI" to the parameter may be all calculated. The present invention is not limited to a process of calculating the percentage. For example, the total number of inputs made in an unpredicted manner within a predetermined period of time may be calculated.

In the third embodiment, for example, the percentage of inputs made in an unpredicted manner may be calculated instead of calculating the number of inputs made in an unpredicted manner.

[Acquisition Means]

In the first to third embodiments, the support tool execution server 50 is used as the input result acquisition means. However, the present invention is not limited to the use of such an acquisition means. For example, the progress server 30 and the support tool execution server 50 may be used as a hardware means that constitutes the acquisition means. Further, the factory result collection PC 20, the progress server 30, and the support tool execution server 50 may be used as a hardware means that constitutes the acquisition means. It is not essential that the hardware means having the functionality of the support tool execution server 50 constitute the acquisition means. For example, the factory result collection PC 20 may be regarded as the acquisition means in the configuration shown in FIG. 1.

[Notification Means]

A means for not collectively displaying determination results about different types of work is not limited to the one exemplified in conjunction with the third embodiment. For example, determination results about setup start, determination results about setup completion, and determination results about processing completion may be displayed in separate tables instead of the information displayed as shown in FIG. 7. In such an instance, a user may be allowed to specify whether or not to display the determination results about setup start, the determination results about setup completion, and the determination results about processing completion and switch between different screens in accordance with the intention of the user. This makes it possible to notify all items of information.

It is not essential that all of the determination results about setup start, the determination results about setup completion, and the determination results about processing completion be notified. For example, only the determination results about processing start and the determination results about processing completion may alternatively be notified.

The first to third embodiments collectively notify the determination results about multiple different processes. However, the present invention is not limited to the use of such a notification of determination results. For example, the determination results about each process may alternatively be displayed in separate tables.

Further, the notification means is not limited to a means for performing a notification process in such a manner that information is viewable by factory workers. For example, the notification means may alternatively perform a notification process in such a manner that the information is viewable only by the administrator.

Furthermore, the notification means is not limited to a means for displaying visual information. If, for instance, a threshold value is exceeded by the number or percentage of inputs made in an unpredicted manner, the notification means may alternatively give a relevant audible notice.

[Method Employed Relative to the Input Means]

The first to third embodiments (FIG. 2) read the process code for only inputs concerning a setup start. However, the present invention is not limited to the use of such a method. For example, the product serial number and the process code may be both read for inputs concerning a setup completion and inputs concerning a processing completion. In this instance, data (OII, OIO, and OOI) from which only the inputs concerning a setup start are excluded may arise even if some input data is not manually corrected by a human in response to an error notification issued after input processing.

[Input Means]

A means having input information is not limited to a one-dimensional code. For example, a two-dimensional code may alternatively be used as the input means.

The input means is not limited to the one that uses a barcode. For example, the input means may include dedicated buttons for setup start, setup completion, and processing completion and a function of searching for a product serial number. In this instance, an input concerning a setup start is made by pressing the setup start button after specifying the product serial number of a current processing target.

[Configuration without Collection Processing Means]

For example, the handy terminal 10 may include a means for comparing a time interval between the instant at which an input concerning a setup start is made and the instant at which an input concerning a setup completion is made against a threshold value and a means for generating an alarm sound or otherwise notifying an improper input if the threshold value is greater than the time interval. In this instance, the means for making such a comparison constitutes the determination means, and the means for generating the alarm sound or the like constitutes the notification means.

[Other]

Setup need not be performed so as to permit a human to manually correct input data inconsistency when it is encountered. Further, a computation processing means for automatically inferring and correcting inconsistencies may be incorporated.

REFERENCE SIGNS LIST

10 Handy terminal (input means)
50 support tool execution server (Manufacturing process management support device)

The invention claimed is:

1. A manufacturing process management support device comprising:
an input device that inputs information indicative of the fact that work related to a manufacturing process is performed;
an acquisition processor that acquires an input result of the input device;
a determination processor that determines in accordance with the input result acquired by the acquisition processor whether or not an input to the input device is made in a predicted manner; and
a notification device that notifies outside of a determination result produced by the determination processor,
wherein the notification device notifies the outside of information about a computation result produced by a collection processing processor as a determination result produced by the determination processor,
wherein the determination processor produces the determination result by inputting the input results concerning individual inputs of different types, the inputs being made to the input device at timings close to each other in accordance with the manufacturing process,
wherein the inputs of different types made at timings close to each other include an input to identify actual time concerning a pair of pieces of work, the pair of pieces of work being processing work that is performed to process a processing target and adjustment work that is performed before the processing work to adjust a member used to process the processing target, and
wherein the determination processor determines in a binary manner whether or not individual inputs to be made to the input device in accordance with the inputs of different types are actually made.

2. The manufacturing process management support device according to claim 1, wherein an input of the determination processor includes an input result concerning the start of the adjustment work, an input result concerning the completion of the adjustment work, and an input result concerning the completion of the processing work.

3. The manufacturing process management support device according to claim 2, wherein the determination processor determines, in accordance with the relationship between the input results concerning the individual inputs of different types, whether or not inputs concerning a plurality of pieces of work performed at timings close to each other are made in a predicted manner.

4. The manufacturing process management support device according to claim 3, wherein the determination processor checks whether the time required for work, which is calculated in accordance with the inputs of different types, is not less than a determination value, and determines, in accordance with the result of the check, whether or not inputs to the input device are made in a predicted manner.

5. The manufacturing process management support device according to claim 2, wherein the determination processor checks whether the time interval between input times for different processing targets concerning inputs of the same type is not less than a determination value, and determines, in accordance with the result of the check, whether or not inputs to the input device are made in a predicted manner.

6. The manufacturing process management support device according to claim 5, wherein the collection processing processor performs a process of calculating at least one of the percentage of inputs made in the predicted manner with respect to pieces of work of the same type and the percentage of inputs not made in the predicted manner with respect to the pieces of work of the same type.

7. The manufacturing process management support device according to claim 6, wherein the notification device outputs visually displayable data to a means for visually displaying the percentage concerning each manufacturing process.

8. The manufacturing process management support device according to claim 2, wherein the determination processor determines in a binary manner whether or not individual inputs to be made to the input device in accordance with the inputs of different types are actually made.

9. The manufacturing process management support device according to claim 2, wherein the collection processing processor performs a process of calculating at least one of the percentage of inputs made in the predicted manner with respect to pieces of work of the same type and the percentage of inputs not made in the predicted manner with respect to the pieces of work of the same type.

10. The manufacturing process management support device according to claim 9, wherein the notification device outputs visually displayable data to a means for visually displaying the percentage concerning each manufacturing process.

11. The manufacturing process management support device according to claim 1, wherein the determination processor determines, in accordance with the relationship between the input results concerning the individual inputs of different types, whether or not inputs concerning a plurality of pieces of work performed at timings close to each other are made in a predicted manner.

12. The manufacturing process management support device according to claim 11, wherein the determination processor checks whether the time required for work, which is calculated in accordance with the inputs of different types, is not less than a determination value, and determines, in accordance with the result of the check, whether or not inputs to the input device are made in a predicted manner.

13. The manufacturing process management support device according to claim 1, wherein the determination processor checks whether the time interval between input times for different processing targets concerning inputs of the same type is not less than a determination value, and determines, in accordance with the result of the check, whether or not inputs to the input device are made in a predicted manner.

14. The manufacturing process management support device according to claim 13, wherein the collection processing processor performs a process of calculating at least one of the percentage of inputs made in the predicted manner with respect to pieces of work of the same type and the percentage of inputs not made in the predicted manner with respect to the pieces of work of the same type.

15. The manufacturing process management support device according to claim 14, wherein the notification device outputs visually displayable data to a means for visually displaying the percentage concerning each manufacturing process.

16. The manufacturing process management support device according to claim 1, wherein the collection processing processor performs a process of calculating at least one of the percentage of inputs made in the predicted manner with respect to pieces of work of the same type and the percentage of inputs not made in the predicted manner with respect to the pieces of work of the same type.

17. The manufacturing process management support device according to claim 16, wherein the notification device outputs visually displayable data to a means for visually displaying the percentage concerning each manufacturing process.

\* \* \* \* \*